(12) United States Patent
Yoshikuwa

(10) Patent No.: US 7,347,109 B2
(45) Date of Patent: Mar. 25, 2008

(54) LOAD CELL WITH FOIL STRAIN GAUGE

(75) Inventor: Nobuyuki Yoshikuwa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 11/082,907

(22) Filed: Mar. 18, 2005

(65) Prior Publication Data

US 2005/0211003 A1    Sep. 29, 2005

(30) Foreign Application Priority Data

Mar. 25, 2004    (JP)    ............................. 2004-088930

(51) Int. Cl.
 *G01L 1/22*    (2006.01)
(52) U.S. Cl. ................................. 73/862.474
(58) Field of Classification Search ........... 73/862.474, 73/781, 782, 1.15; 257/417
See application file for complete search history.

(56) References Cited

U.S. PATENT DOCUMENTS

| | | | | |
|---|---|---|---|---|
| 3,543,568 A | * | 12/1970 | Russell | ......................... 73/767 |
| 4,546,652 A | * | 10/1985 | Virkar et al. | .................. 73/776 |
| 4,744,252 A | * | 5/1988 | Stout | ............................ 73/768 |
| 2004/0010303 A1 | * | 1/2004 | Bolea et al. | ................. 607/118 |

FOREIGN PATENT DOCUMENTS

JP    2003322571 A    * 11/2003

OTHER PUBLICATIONS

"identical." Collins English Dictionary. 2000. CredoReference. Jan. 7, 2008 <http://www.credoreference.com/entry/2656631>.*

* cited by examiner

*Primary Examiner*—Edward Lefkowitz
*Assistant Examiner*—Punam Patel
(74) *Attorney, Agent, or Firm*—Manabu Kanesaka

(57) ABSTRACT

A foil strain gage is attached to a strained section for outputting a resistance change proportional to a strain generated at the strained section. The foil strain gage includes two grid-shaped resistors disposed in parallel on an insulating base material as detecting sections. The two detecting sections generate identical detection outputs when the foil strain gage is bonded on the strained section.

7 Claims, 4 Drawing Sheets

LOAD CELL WITH FOIL STRAIN GAUGE

BACKGROUND OF THE INVENTION AND RELATED ART STATEMENT

The present invention relates to a load cell with a foil strain gage. More specifically, the present invention relates to an electric balance with a foil strain gage capable of effectively reducing a measuring error due to an eccentric loading error.

In a conventional foil strain gage for converting a strain into a resistance change, a grid-shaped thin metal film as a resistor R is attached on an insulating base material 2 and both terminals thereof are connected to gage leads L, as shown in FIG. 4. A resistance Ro in a state without a strain, a resistance change $\Delta R$ at a rated tensile strain, and a resistance change $-\Delta R$ at a rated compressive strain are usually specified. Such a foil strain gage H is applied to load cells 1A and 1B for measuring a weight of an object as shown in FIGS. 5 and 6.

FIG. 5 is a perspective view of the load cell 1A. Foil strain gages H1 to H4 having a structure same as the foil strain gage H are bonded on strained sections S1 to S4 at an upper section 31 and a lower section 32 of a load cell body 3 formed of an elastic rectangular parallelepiped metal material having an eyeglass-shaped hollow section. One end of the load cell 1A is used as a movable column 33, and the other end thereof is used as a stationary column 34. When a load W is applied to the movable column 33, a compressive strain is generated at the strained sections S1 and S4, and a tensile strain is generated at the strained sections S2 and S3. Strains $\epsilon 1$ to $\epsilon 4$ at the strained sections S1 to S4 have magnitudes proportional to the load W and distributions in an axial direction shown in FIG. 7.

Incidentally, FIG. 7 is a graph showing a position in the axial direction and an amount of strain in case the load W is applied. An X-axis shows a location along a center line of FIG. 5, and a Y-axis shows an amount of strain.

The foil strain gages H1 to H4 are attached to the strained sections S1 to S4 as shown in FIG. 5 to form a Wheatstone bridge as shown in FIG. 8, so that the magnitudes of the strains are detected as resistance changes. Assuming that the resistance changes of the foil strain gages H1 to H4 are identical, an output voltage V is expressed by the following equation (6), wherein Ro is the resistance in a state without a strain, $\Delta R$ is the resistance change caused by the strain, and Vb is a reference voltage of the Wheatstone bridge.

$$V=(\Delta R/Ro)Vb \quad (6)$$

FIG. 6 is a perspective view of the load cell 1B. The foil strain gages H1 and H4 and the foil strain gages H2 and H3 are bonded on the strained sections S1 and S2 at the upper section 31 of the load cell body 3, respectively. With the Wheatstone bridge shown in FIG. 8, the output voltage V is obtained by the equation (6).

Patent Reference 1: Japanese Patent Publication (Kokai) No. 2003-322571

In the conventional load cells 1A and 1B, the output voltage V expressed by the equation (6) is proportional to a weight of an object, and is obtained through the Wheatstone bridge shown in FIG. 8 with the foil strain gages H1 to H4. In the case of the load cell 1A, the foil strain gages H1 to H4 are bonded over the vertical plane including the central axis of the load cell 1A, so that their center lines coincide with the central axis as shown in FIG. 5. Accordingly, there is a minimal measurement error between when the object is placed at the center and when the object is placed at an off-center position (eccentric loading errors) on a weighing pan (not shown) located above the movable column 33.

However, in the load cell 1A, the foil strain gages are bonded on both the upper section 31 and the lower section 32, thereby reducing work operation efficiency.

In the case of the load cell 1B, on the other hand, the foil strain gages H1 to H4 are bonded only on the upper section 31, thereby improving work operation efficiency. However, the foil strain gages are bonded at locations away from the vertical plane including the center line of the load cell 1B, thereby inducing an eccentric loading error.

In view of the problems described above, an object of the present invention is to provide a foil strain gage capable of forming a high-precision load cell with a minimal eccentric loading error.

Further objects and advantages of the invention will be apparent from the following description of the invention.

SUMMARY OF THE INVENTION

In order to achieve the objects described above, according to the present invention, a foil strain gage is attached to a strained section for outputting a resistance change proportional to a strain generated at the strained section. The foil strain gage comprises two grid-shaped resistors disposed in parallel on an insulating base material as detecting sections, so that the two detecting sections generate identical detection outputs when the foil strain gage is bonded on the strained section.

The foil strain gage according to the present invention is constructed as described above to generate two identical detection signals, thereby forming an ideal Wheatstone bridge.

In the invention, the foil strain gage is provided with the two detecting sections having an identical property for obtaining two detection outputs having an identical property from one strained section. The foil strain gages are attached to compressive and tensile strained sections at an upper section of a load cell body to form the Wheatstone bridge, thereby improving work operation efficiency. Moreover, the foil strain gages are bonded on a center line of the load cell. Accordingly, it is possible to detect a strain in the vicinity of the center line without a significant influence of an eccentric loading error, thereby reducing a measurement error due to an eccentric loading.

BRIEF DESCRIPTION OF THE DRAWINGS

FIGS. 1(a) and 1(b) are views showing a foil strain gage according to an embodiment of the present invention, wherein FIG. 1(a) is a plan view thereof and FIG. 1(b) is a side view thereof;

FIGS. 2(a) and 2(b) are views showing a load cell with the foil strain gage according to an embodiment of the present invention, wherein FIG. 2(a) is a plan view thereof and FIG. 2(b) is a side view thereof;

DETAILED DESCRIPTION OF PREFERRED EMBODIMENTS

Figure 1A:
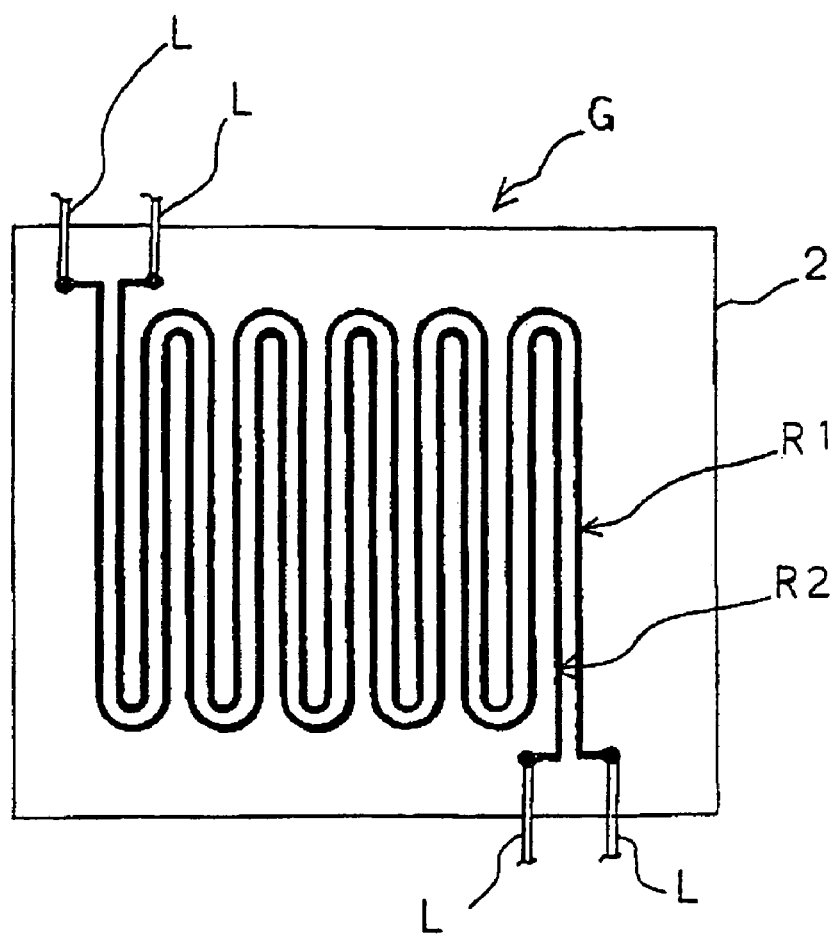
Figure 1B:
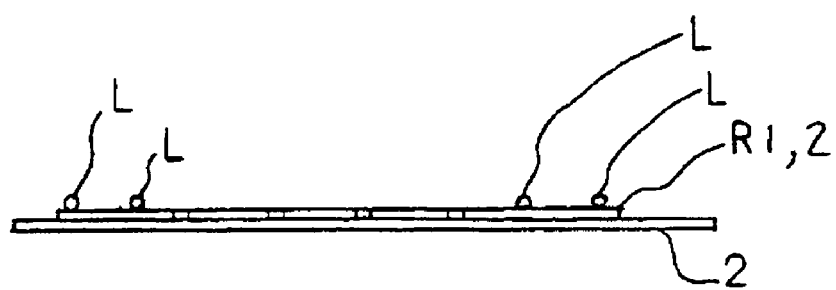

Hereunder, embodiments of the present invention will be explained with reference to the accompanying drawings. FIGS. 1(a) and 1(b) are views showing a foil strain gage according to an embodiment of the present invention, wherein FIG. 1(a) is a plan view thereof and FIG. 1(b) is a side view thereof.

A foil strain gage G includes a thin film made of paper, polyester, epoxy, Bakelite or the like as a base material 2. A metallic foil made of a copper-nickel alloy, nickel-chromium alloy or the like is bonded on a surface of the base material 2. Resistors R1 and R2 having two independent grid-shaped patterns are formed on the metallic foil with a photolithographic etching technique, and gage leads L are connected to both ends of each resistor. Since the resistors R1 and R2 are formed in the identical pattern in parallel proximity, the foil strain gage G is capable of obtaining two independent strain detection signals with an identical property based on a resistance change.

Figure 2A:
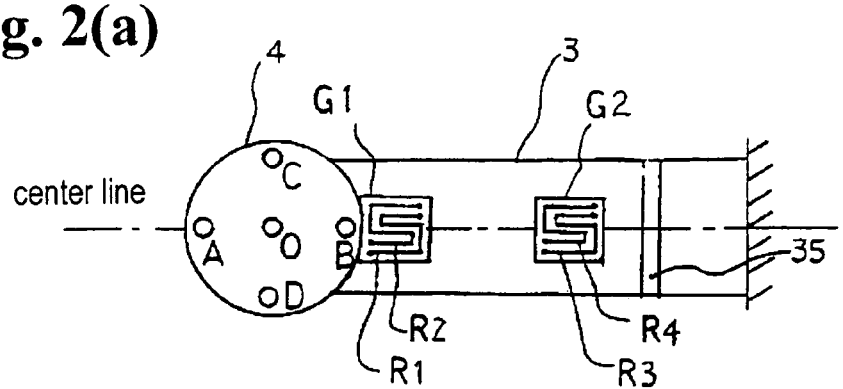
Figure 2B:
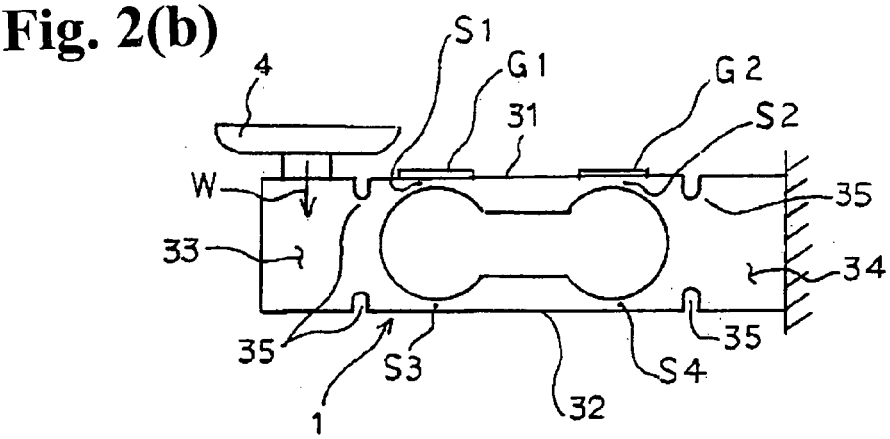
Figure 5:
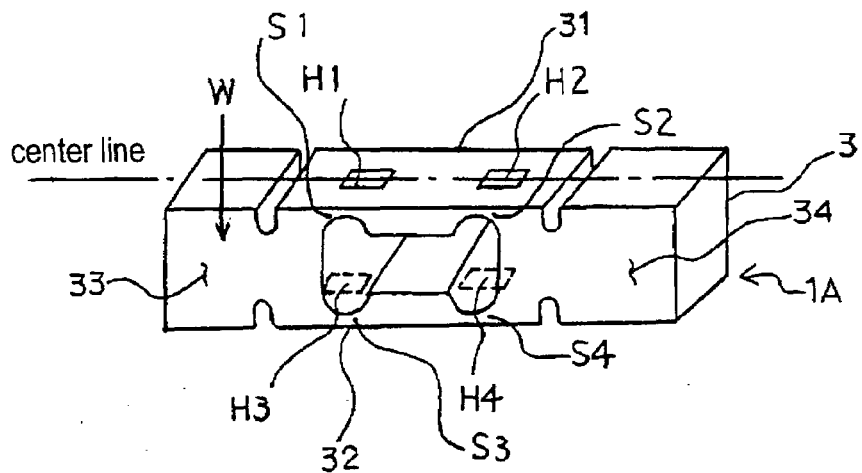
FIG. 5 is a view showing a load cell using the conventional foil strain gage.
Figure 6:
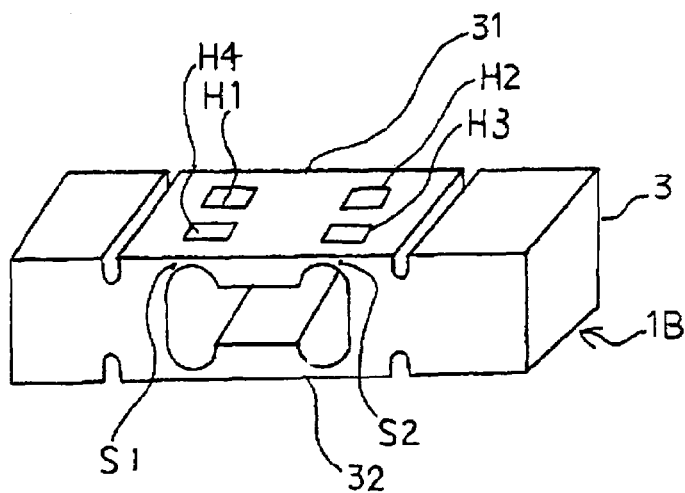
FIG. 6 is a view showing another load cell using the conventional foil strain gage.
Figure 7:
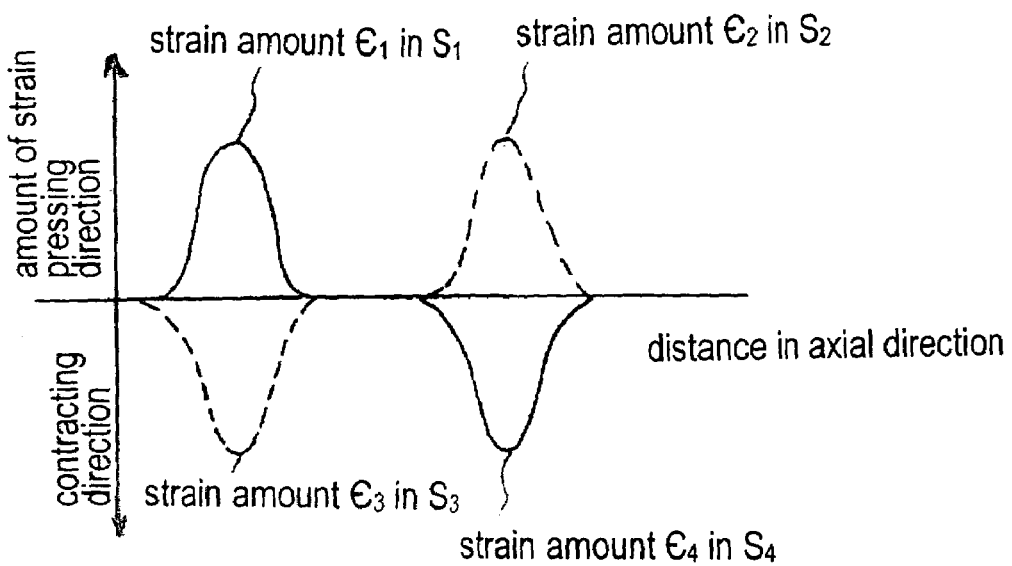
FIG. 7 is a chart showing a distribution of strains at strained sections of a load cell.
Figure 8:
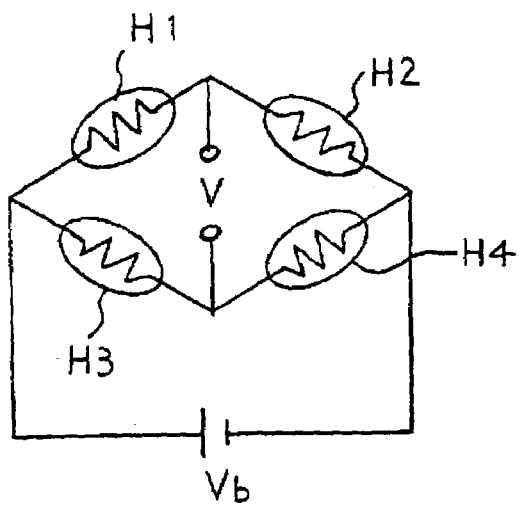
FIG. 8 is a circuit diagram showing a Wheatstone bridge formed of the conventional foil strain gages.

An embodiment of a load cell using the foil strain gage G will be described next. FIGS. 2(a) and 2(b) are views showing a load cell 1 with the foil strain gage G, wherein FIG. 2(a) is a plan view thereof and FIG. 2(b) is a side view thereof. A load cell body 3 of the load cell 1 in the embodiment may be one similar to the load cell body 3 used in the conventional load cells 1A and 1B shown in FIGS. 5 and 6, respectively. In other words, the load cell body 3 is an elastic rectangular parallelepiped metal material having an eyeglass-shaped hollow section. Strained sections S1 and S2 are formed in thin-walled portions of an upper section 31, and strained sections S3 and S4 are formed in thin-walled sections of a lower section 32.

A groove 35 is provided on an outer side of each of the strained sections S1 and S2 on the upper section 31 and strained sections S3 and S4 on the lower section 32. Foil strain gages G1 and G2 are bonded with adhesive on the strained sections S1 and S2 such that their center lines coincide with a center line of the upper section 31 as shown in FIG. 2(a). One end of the load cell body 3 is connected to a weighing pan 4 as a movable column 33 to move in the vertical direction, and the other end thereof is fixed as a stationary column 34 to form a Roberval mechanism. When the load W is applied to the movable column 33, compressive strains are generated at the strained sections S1 and S4 and tensile strains are generated at the strained sections S2 and S3.

Figure 3:
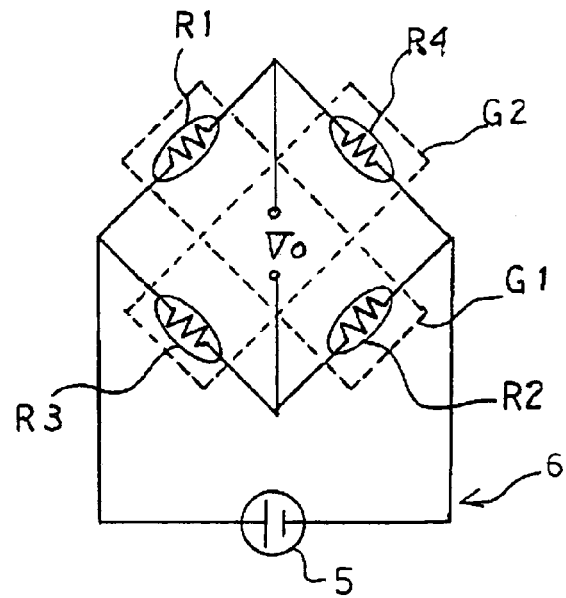
FIG. 3 is a circuit diagram showing a Wheatstone bridge according to the embodiment of the present invention.
Figure 4:
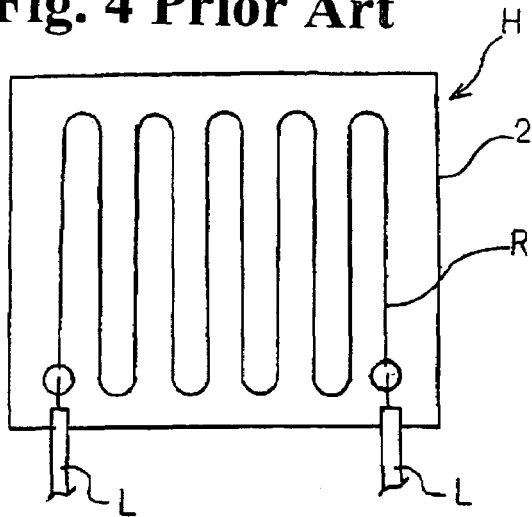
FIG. 4 is a plan view showing a conventional foil strain gage.

The foil strain gages G1 and G2 have the resistors R1 and R2 with the identical property and the resistors R3 and R4 with the identical property, respectively. The resistors R1 to R4 form the Wheatstone bridge 6 shown in FIG. 3 via the gage leads L (see FIG. 1), together with a reference power supply 5. Assuming that resistances of the resistors R1 to R4 are r1 to r4 and an output voltage of the reference power supply 5 is Vb, an output voltage Vo is obtained from the Wheatstone bridge 6 by the following equation (1).

$$Vo = (r3 \cdot r4 - r1 \cdot r2)Vb/((r1+r4)(r2+r3)) \tag{1}$$

When an object to be weighed is placed at a center point O of the weighing pan 4 to apply the load W, a compressive strain $\epsilon_1$ is applied to the foil strain gage G1. The resistances r1 and r2 of the resistor R1 and R2 decrease from the resistance Ro in a state without a strain in proportion to a proportional factor $K_{12}$. A tensile strain $\epsilon_1$ is applied to the foil strain gage G2, and the resistances r3 and r4 of the resistor R3 and R4 increase from the resistance Ro in a state without a strain in proportion to a proportional factor $K_{34}$.

These relationships are expressed by the following equations (2) and (3).

$$r1, r2 = Ro - K_{12}W \tag{2}$$

$$r3, r4 = Ro + K_{34}W \tag{3}$$

From the equations (1) to (3), the output voltage Vo expressed by the following equation (4) is obtained by the load cell 1 with the foil strain gages G1 and G2.

$$Vo = Vb \cdot W(K_{34}+K_{12})/((2 Ro+(K_{34}-K_{12})W) \tag{4}$$

The foil strain gages G1 and G2 with the equal proportional factors $K_{12}$ and $K_{34}$ are used together, so that the output voltage Vo proportional to the load W is obtained by the following equation (5).

$$Vo = K_{12} \cdot Vb \cdot W/Ro \tag{5}$$

The load cell body 3 is formed of a Roberval mechanism, so that the movable column 33 converts the load W into a vertical load. Accordingly, when an object to be weighed is placed at a point A or B, i.e., a position shifted from the center point O on the center line of the load cell body 3, the strains $\epsilon_1$ and $\epsilon_2$ are the same as those when the object is placed at the center point O. Therefore, the load W is converted into the output voltage Vo by the equation (5).

Moreover, when the object to be weighed is placed at point C or D, i.e., a position shifted from the center point O in the direction perpendicular to the center axis of the load cell body 3, a twisting force in a clockwise or counterclockwise direction is applied to the upper section 31 of the load cell body 3. Accordingly, the strains at the strained sections S1 and S2 differ from those at two sides across the center axis. In the load cell 1, the foil strain gages G1 and G2 are bonded on the center axis. Accordingly, there is a minimal difference between the strains $\epsilon_1$ and $\epsilon_2$ at the strained sections S1 and S2 and the strains $\epsilon_1$ and $\epsilon_2$ when the object is placed at the center point O, and the load W is converted into the output voltage Vo by the equation (5).

As described above, in the present invention, the foil strain gages G1 and G2 are simply bonded only on the strained sections S1 and S2 of the upper section 31 where compressive and tensile strains occur, so that the foil strain gages G1 and G2 form the Wheatstone bridge 6 (see FIG. 3) for detecting the load W, thereby making the structure simple and improving work operation efficiency.

Moreover, the foil strain gages G1 and G2 are bonded on the central line of the load cell body 3. Accordingly, it is possible to avoid the detection of the strains from the strained locations susceptible to an eccentric loading error, thereby reducing a measurement error due to eccentric loading.

The disclosure of Japanese Patent Application No. 2004-088930, filed on Mar. 25, 2004, is incorporated in the application.

While the invention has been explained with reference to the specific embodiments of the invention, the explanation is illustrative and the invention is limited only by the appended claims.

What is claimed is:

1. A load cell with a foil strain gage comprising:
   a load cell body, and
   a plurality of foil strain gages arranged on a center line of the load cell body to be spaced apart from each other, each strain gage comprising an insulating base, and two resistors arranged in a grid shape on the insulating base in parallel to each other on a same plane as detecting sections so that the resistors generate identical detection outputs at a strained section.

2. A load cell with a foil strain gage according to claim 1, wherein said two resistors have lengths equal to each other and are arranged to turn successively in lateral directions on the insulating base so that the two resistors cover substantially a same area.

3. A load cell with a foil strain gage according to claim 2, wherein said resistors have gage leads at ends thereof.

4. A load cell with a foil strain gage according to claim 3, wherein said resistors detect a resistance change proportional to a strain at the strained section.

5. A load cell with a foil strain gage comprising:
a load cell body, and
a plurality of foil strain gages arranged on a center line of the load cell body to be spaced apart from each other, each strain gage comprising an insulating base, and two resistors arranged parallel to each other on a same plane on the insulating base, said two resistors winding successively in a wavy shape and substantially covering a same area on the insulating base as detecting sections.

6. A load cell with a foil strain gage according to claim 5, wherein the two resistors generate identical detection outputs at said same area for a strained section.

7. A load cell with a foil strain gage according to claim 6, wherein each of the resistors has linear sections and curved end sections connected to the linear sections, said linear sections in the two resistors being arranged adjacent to each other successively.

* * * * *